United States Patent
Lee et al.

(10) Patent No.: US 11,235,709 B2
(45) Date of Patent: Feb. 1, 2022

(54) ENTERTAINMENT APPARATUS FOR SELF-DRIVING VEHICLE

(71) Applicants: Hyundai Motor Company, Seoul (KR); Kia Motors Corporation, Seoul (KR)

(72) Inventors: Baek Hee Lee, Gyeonggi-do (KR); Min Hyuk Kwak, Seoul (KR); Jin Hee Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/653,470

(22) Filed: Oct. 15, 2019

(65) Prior Publication Data
US 2020/0377036 A1 Dec. 3, 2020

(30) Foreign Application Priority Data
May 31, 2019 (KR) .................. 10-2019-0064265

(51) Int. Cl.
*A63F 13/20* (2014.01)
*B60R 11/02* (2006.01)
(Continued)

(52) U.S. Cl.
CPC ...... *B60R 11/0235* (2013.01); *A63F 13/2145* (2014.09); *A63F 13/42* (2014.09);
(Continued)

(58) Field of Classification Search
CPC .... A63F 13/214; A63F 13/218; A63F 13/245; A63F 13/285; A63F 13/803;
(Continued)

(56) References Cited

U.S. PATENT DOCUMENTS 5,336,132 A * 8/1994 Murakami ............. G09B 9/063
472/59
9,108,733 B2 * 8/2015 Sizelove .................. A47C 7/74
(Continued)

FOREIGN PATENT DOCUMENTS

JP  2007268102 A  10/2007
JP  2015150022 A   8/2015
(Continued)

OTHER PUBLICATIONS

"MBUX im CLA spielt auf dem MWC 2019 einen Mario-Kart-Klon" published by ComputerBase on Youtube on Feb. 25, 2019, printed and accessed from URL <https://www.youtube.com/watch?v=DkEe8zKMhlA&feature=emb_title>, 4 pages. (Year: 2019).*
(Continued)

*Primary Examiner* — Lawrence S Galka
(74) *Attorney, Agent, or Firm* — Mintz Levin Cohn Ferris Glovsky and Popeo, P.C.; Peter F. Corless

(57) ABSTRACT

An entertainment apparatus for a self-driving vehicle is configured to enable a passenger to playa game while viewing a game start image of a display installed in a seat in a state in which the passenger sits on the seat, where the game is executed and proceeds based on a signal that is obtained by detecting a distribution of human body pressure of the passenger by a body pressure sensor installed in the seat and a signal obtained by detecting touch pressure of the passenger by a touch pad installed in the seat, and thus the passenger is capable of playing various games related to body pressure and/or a touch signal while moving his or her body.

15 Claims, 14 Drawing Sheets

(51) Int. Cl.
*A63F 13/2145* (2014.01)
*A63F 13/42* (2014.01)
*G06F 3/01* (2006.01)
*B60N 99/00* (2006.01)
*A63F 13/803* (2014.01)
*B60N 2/00* (2006.01)
*B60R 11/00* (2006.01)
*A63F 13/52* (2014.01)

(52) U.S. Cl.
CPC ............ *B60N 99/00* (2013.01); *G06F 3/011* (2013.01); *A63F 13/52* (2014.09); *A63F 13/803* (2014.09); *B60N 2/002* (2013.01); *B60R 2011/0014* (2013.01)

(58) Field of Classification Search
CPC . G07F 17/3202; G07F 17/3216; B60K 35/00; A47C 15/004; A47C 7/62; A47C 7/723; B60N 2002/0268; B60N 2/002; B60N 2/0228; B60R 11/0235; B60R 2011/0084; B60R 2011/009; B60R 21/015; B60R 2300/70; B64D 11/0015; B64D 11/00155
See application file for complete search history.

(56) References Cited

U.S. PATENT DOCUMENTS

| | | | | |
|---|---|---|---|---|
| 10,650,331 | B1* | 5/2020 | Mossoba | G07C 9/00309 |
| 2006/0283652 | A1 | 12/2006 | Yanai et al. | |
| 2008/0129684 | A1* | 6/2008 | Adams | B60K 35/00 |
| | | | | 345/156 |
| 2009/0085383 | A1* | 4/2009 | Hicks | B60K 37/06 |
| | | | | 297/217.3 |
| 2009/0206641 | A1* | 8/2009 | Brown, Jr. | A47C 15/004 |
| | | | | 297/217.3 |
| 2012/0302302 | A1* | 11/2012 | Hamlin | G07F 17/3202 |
| | | | | 463/7 |
| 2012/0302323 | A1* | 11/2012 | Gagner | G07F 17/3202 |
| | | | | 463/25 |
| 2012/0315971 | A1* | 12/2012 | Granger | G07F 17/3216 |
| | | | | 463/16 |
| 2012/0315985 | A1* | 12/2012 | Granger | G07F 17/3216 |
| | | | | 463/31 |
| 2013/0005442 | A1* | 1/2013 | Erickson | G07F 17/32 |
| | | | | 463/25 |
| 2014/0309035 | A1* | 10/2014 | Crawford | A63F 13/803 |
| | | | | 463/36 |
| 2014/0319895 | A1* | 10/2014 | Lange-Mao | B60N 2/0224 |
| | | | | 297/463.1 |
| 2015/0350413 | A1* | 12/2015 | Ma | H04M 1/7253 |
| | | | | 455/418 |
| 2017/0041816 | A1* | 2/2017 | Cho | H04W 24/08 |
| 2017/0123423 | A1* | 5/2017 | Sako | G05D 1/0088 |
| 2017/0169690 | A1* | 6/2017 | Pfeiffer | B60N 2/0232 |
| 2018/0170231 | A1 | 6/2018 | Song | |
| 2018/0264347 | A1* | 9/2018 | Tran | A63B 71/145 |
| 2018/0339672 | A1* | 11/2018 | Kubiak | A63G 7/00 |
| 2019/0003876 | A1* | 1/2019 | Aina | B60R 21/01516 |
| 2020/0041997 | A1* | 2/2020 | Tuukkanen | B60W 30/0956 |

FOREIGN PATENT DOCUMENTS

| | | |
|---|---|---|
| KR | 101201655 B1 | 11/2012 |
| KR | 101305565 B1 | 9/2013 |
| KR | 20180128767 A | 12/2018 |

OTHER PUBLICATIONS

"Mercedes Will Let You Play Racing Video Games in Your Car" written by Jared Rosenholtz, published on Mar. 8, 2019, printed and accessed from URL <https://carbuzz.com/news/mercedes-will-let-you-play-racing-video-games-in-your-car>, 6 pages. (Year: 2019).*

"We played video games inside a Tesla Model 3: Tesla Arcade" published by Autoblog on Youtube on Jul. 2, 2019, printed and accessed from URL <https://www.youtube.com/watch?v=buN9rlQgVWM>, 9 pages. (Year: 2019).*

* cited by examiner

[ DISPLAY UNUSED ]

[ DISPLAY USED ]
(NORMAL POSTURE)

[ DISPLAY USED ]
(FULLY RECLINING POSTURE)

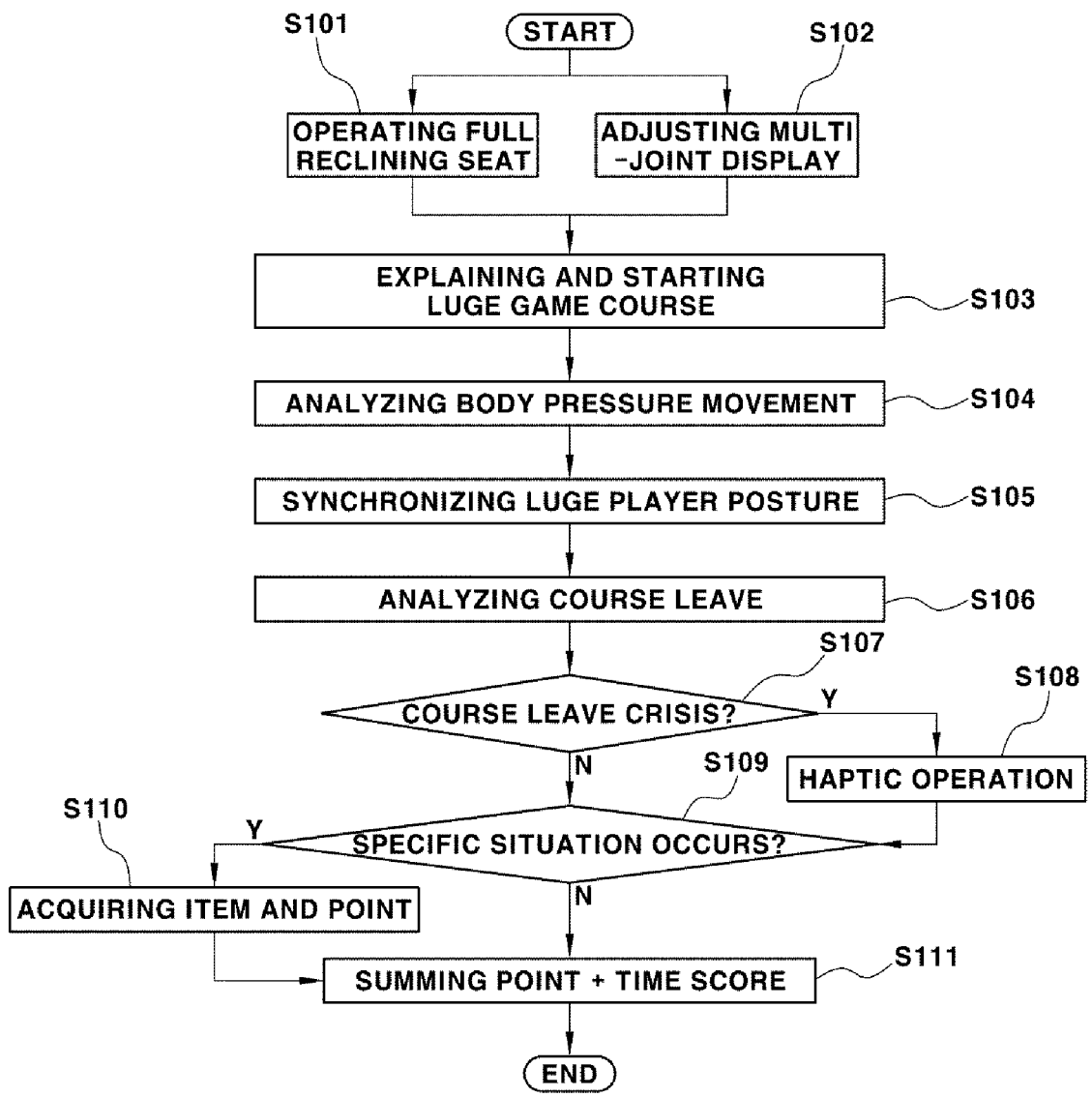

ENTERTAINMENT APPARATUS FOR SELF-DRIVING VEHICLE

CROSS-REFERENCE TO RELATED APPLICATION

This application claims under 35 U.S.C. § 119(a) the benefit of Korean Patent Application No. 10-2019-0064265 filed on May 31, 2019, the entire contents of which are incorporated herein by reference.

BACKGROUND

(a) Technical Field

The present disclosure relates to an entertainment apparatus for a self-driving vehicle, more particularly, to the entertainment apparatus which allows a passenger to play various games using a body pressure sensor, a touch pad, and the like, which are installed in a seat.

(b) Description of the Related Art

In the case of a self-driving vehicle that is capable of being driven without manipulation by a driver, passengers inside the vehicle can take a desired posture in various forms while sitting on a seat and conversing with other passengers, or for viewing the outdoor landscape, reading, relaxation, sleep, and so on.

To this end, research has been conducted into a seat for a self-driving vehicle to which various mechanisms are applied beyond a basic mechanism for forward and backward seat adjustment, such as a seat position movement and swivel mechanism, upward and downward adjustment of a seat height, a tilting function, and so on.

As described above, research has been conducted into a dedicated seat mechanism for a self-driving vehicle for enabling a passenger to sit in various postures, but passengers inevitably maintain a static posture in a confined space during a long drive, and thus may experience stiffness, stuffiness, and/or boredom.

For example, in the case of a self-driving vehicle, passengers spend most of their time using a cell phone (e.g., smartphone), looking at the outdoor landscape, reading a book, using a computer, etc. while maintaining a static posture in a confined space during a long drive, and thus the lack of human body motion may be accompanied by boredom, severe motion sickness, or the like.

Accordingly, there is a need for entertainment devices that provide passengers with an exercise effect of moving the human body and simultaneously alleviate boredom during a long trip in a self-driving vehicle.

SUMMARY

In one aspect, the present disclosure provides an entertainment apparatus for a self-driving vehicle in which a passenger plays a game while viewing a game start image of a display installed in the vicinity of a seat in a state in which the passenger sits on the seat of a self-driving vehicle, in which the game is executed and proceeds based on a signal that is obtained by detecting a distribution of human body pressure of the passenger by a body pressure sensor installed in the seat and a signal obtained by detecting touch pressure of the passenger through a touch pad installed in the seat, and thus the passenger is capable of playing various games related to body pressure and/or a touch signal while moving his or her body.

In a preferred embodiment, an entertainment apparatus for a self-driving vehicle includes a body pressure sensor module installed at right and left symmetric positions of a seat back and a seat cushion and configured to detect distribution of upper body pressure and lower body pressure of a passenger, a touch pad installed in the seat back or the seat cushion capable of detecting touch pressure of the passenger, a display unit disposed at a position in the seat that the passenger is capable of viewing and configured to display a start image of a game selected by the passenger, and a control unit configured to output the start image of the game selected by the passenger to the display unit and to simultaneously control overall execution of the game selected by the passenger based on a detection signal of the body pressure sensor module or a detection signal of the touch pad, or the detection signal of the body pressure sensor module and the detection signal of the touch pad.

The body pressure sensor module may include a first body pressure sensor module installed at right and left symmetric positions of the seat back and configured to detect the distribution of the upper body pressure of the passenger, and a second body pressure sensor module installed at right and left symmetric positions of the seat cushion and configured to detect the distribution of the lower body pressure of the passenger.

The first body pressure sensor module may include a $(1\text{-}1)^{th}$ left body pressure sensor configured to detect body pressure of a left upper back of the passenger, a $(1\text{-}2)^{nd}$ left body pressure sensor configured to detect body pressure of a left center back of the passenger, a $(1\text{-}3)^{rd}$ left body pressure sensor configured to detect body pressure of a left side of a waist of the passenger, a $(1\text{-}1)^{th}$ right body pressure sensor configured to detect body pressure of a right upper back of the passenger, a $(1\text{-}2)^{nd}$ right body pressure sensor configured to detect body pressure of a right center back of the passenger, and a $(1\text{-}3)^{rd}$ right body pressure sensor configured to detect body pressure of a right side of a waist of the passenger.

The second body pressure sensor module may include a $(2\text{-}1)^{th}$ left body pressure sensor configured to detect body pressure of a left buttock of the passenger, a $(2\text{-}2)^{nd}$ left body pressure sensor configured to detect body pressure of a left thigh of the passenger, a $(2\text{-}1)^{th}$ right body pressure sensor configured to detect body pressure of a right buttock of the passenger, and a $(2\text{-}2)^{nd}$ right body pressure sensor configured to detect body pressure of a right thigh of the passenger.

The plurality of touch pads may include first, second, and third left touch pads that are installed to be spaced apart from each other in upward and downward directions at left edge portions of the seat back, first, second, and third right touch pads that are installed to be spaced apart from each other in upward and downward directions at right edge portions of the seat back, first and second lower touch pads that are installed to be spaced apart from each other in right and left directions at front edge portions of the seat cushion, and first and second upper touch pads installed at opposite side portions of a head rest.

The display unit may include an articulated link connected to an arm rest installed at one side of the seat to be changed in direction, and a display rotatably installed at an end portion of the articulated link.

The control unit may include a game selection input unit configured to input a game type and mode, a game execution controller configured to execute the game type and mode input through the game selection input unit and to simultaneously apply an enable signal to the body pressure sensor module and the touch pad, a game operation calculation unit configured to receive a detection signal of the body pressure sensor module and the touch pad, to calculate a current game playing operation of the passenger, and to then input a calculation result to the game execution controller, and a game output unit configured to output a game start image and a sound in response to a command from the game execution controller.

The game execution controller may include a game storage unit configured to store game types using body pressure and touch and game types using only body pressure or touch as a game that is capable of being selected by the passenger.

The control unit may include a seat position controller configured to output a signal for adjustment of a seat position according to the game type and mode input through the game selection input unit, a seat position driver configured to adjust a seat position in response to a command from the seat position controller, and a seat vibration unit configured to vibrate the seat in a specific situation while the game is executed in response to the command from the game execution controller.

The seat position driver may be selected as an electromotive reclining device installed at the seat back, and an electromotive height adjustment device installed in the seat cushion.

The seat vibration unit may be selected as a vibration device installed at a predetermination position of the seat back or the seat cushion and configured to provide a haptic response.

The entertainment apparatus may further include a facial expression recognition camera configured to recognize a facial expression of the passenger and to determine whether to terminate the game.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 6A is a flowchart showing a procedure of executing a luge game using an entertainment apparatus for a self-driving vehicle according to the present disclosure;

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present disclosure, examples of which are illustrated in the accompanying drawings and described below.

Figure 1:
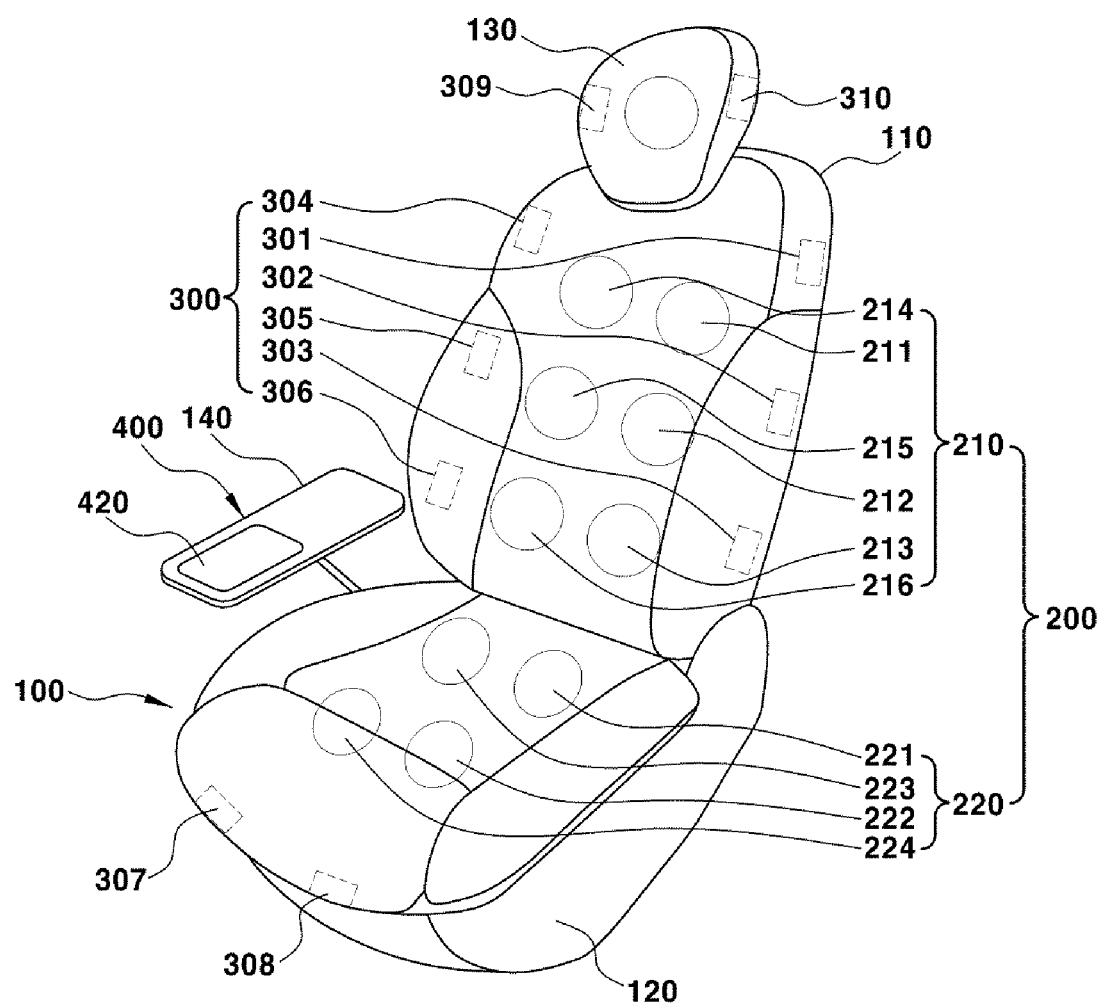
FIG. 1 is a configuration diagram showing the configuration of an entertainment apparatus for a self-driving vehicle according to the present disclosure.

FIG. 1 is a configuration diagram showing the configuration of an entertainment apparatus for a self-driving vehicle according to the present disclosure. Reference numeral 100 refers to a seat in a self-driving vehicle.

The seat 100 may include a seat back 110 configured to support the upper body of a passenger, a seat cushion 120 configured to support a lower body of the passenger, and a head rest 130 configured to support a head portion of the passenger.

A body pressure sensor module 200, configured to detect a distribution of upper body pressure and lower body pressure of the passenger so as to use the distribution as an input signal to play a game, may be installed at right and left symmetric positions of the seat back 110 and the seat cushion 120.

As shown in FIG. 1, the body pressure sensor module 200 may include a first body pressure sensor module 210 installed at right and left symmetric positions of the seat back 110 and configured to detect the distribution of the upper body pressure of the passenger, and a second body pressure sensor module 220 installed at right and left symmetric positions of the seat cushion 120 and configured to detect the distribution of the lower body pressure of the passenger.

In particular, the first body pressure sensor module 210 may detect a change in the distribution of body pressure when the upper body of the passenger is close to the seat back 110, and may include a $(1\text{-}1)^{th}$ left body pressure sensor 211 configured to detect the body pressure of a left upper back of the passenger, a $(1\text{-}2)^{nd}$ left body pressure sensor 212 configured to detect the body pressure of a left center back of the passenger, a $(1\text{-}3)^{rd}$ left body pressure sensor 213 configured to detect the body pressure of a left side of a waist of the passenger, a $(1\text{-}1)^{th}$ right body pressure sensor 214 configured to detect body pressure of a right upper back of the passenger, a $(1\text{-}2)^{nd}$ right body pressure sensor 215 configured to detect body pressure of a right center back of the passenger, and a $(1\text{-}3)^{rd}$ right body pressure sensor 216 configured to detect body pressure of a right side of a waist of the passenger.

In this case, the $(1\text{-}1)^{th}$ left body pressure sensor 211, the $(1\text{-}2)^{nd}$ left body pressure sensor 212, and the $(1\text{-}3)^{rd}$ left body pressure sensor 213 may be installed in a left region of the seat back 110 in upward and downward direction sat equidistant intervals, and the $(1\text{-}1)^{th}$ right body pressure sensor 214, the $(1\text{-}2)^{nd}$ right body pressure sensor 215, and the $(1\text{-}3)^{rd}$ right body pressure sensor 216 may be installed in a right region of the seat back 110 in upward and downward directions at equidistant intervals.

In particular, the second body pressure sensor module 220 may include a $(2\text{-}1)^{th}$ left body pressure sensor 221 configured to detect the body pressure of a left buttock of the passenger, a $(2\text{-}2)^{nd}$ left body pressure sensor 222 configured to detect body pressure of a left thigh of the passenger, a $(2\text{-}1)^{th}$ right body pressure sensor 223 configured to detect the body pressure of a right buttock of the passenger, and a $(2\text{-}2)^{nd}$ right body pressure sensor 224 configured to detect the body pressure of a right thigh of the passenger.

In this case, the $(2\text{-}1)^{th}$ left body pressure sensor 221 and the $(2\text{-}2)^{nd}$ left body pressure sensor 222 may be installed in a left region of the seat cushion 120 in forward and backward directions at equidistant intervals, and the $(2\text{-}1)^{th}$ right body pressure sensor 223 and the $(2\text{-}2)^{nd}$ right body pressure sensor 224 may be installed in a right region of the seat cushion 120 in forward and backward directions at equidistant intervals.

Figure 4:
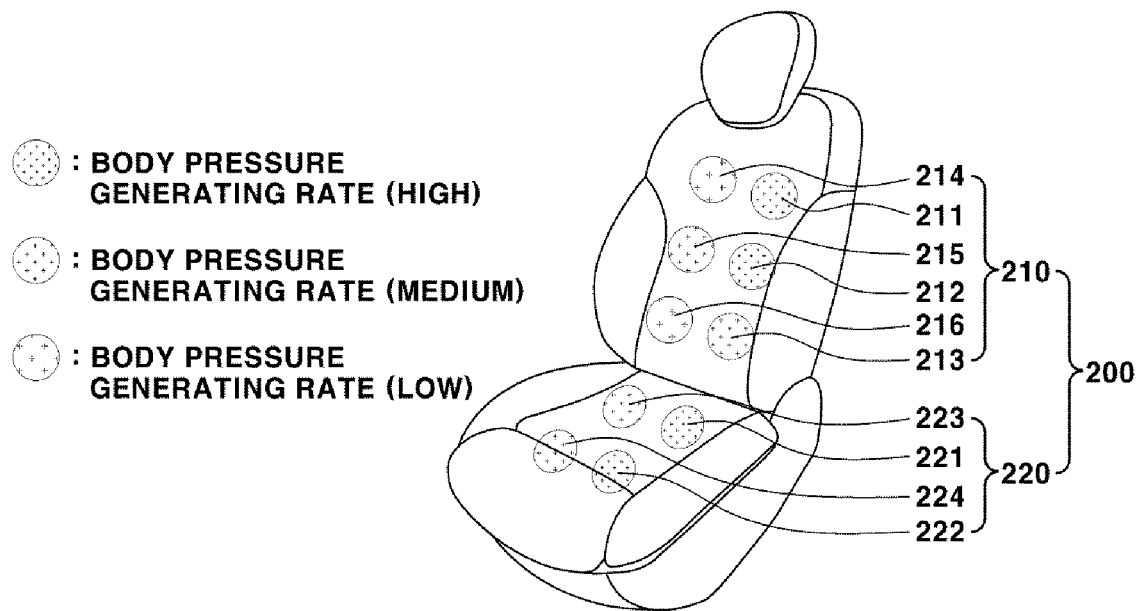
FIG. 4 is a schematic diagram showing an example in which a degree of generation of body pressure and the ratio of generation of body pressure sensed by each body pressure sensor among components of an entertainment apparatus for a self-driving vehicle are changed according to the present disclosure.

Accordingly, the first body pressure sensor module 210 may detect the distribution of the upper body pressure of the passenger, and the second body pressure sensor module 220 may detect the distribution of the lower body pressure of the passenger, in which case the ratio in which body pressure is generated may be differentiated and detected according to upper, center, and lower back regions and may then be transmitted to a game operation calculation unit 530 of a control unit 500, as shown in FIG. 4.

Figure 2:
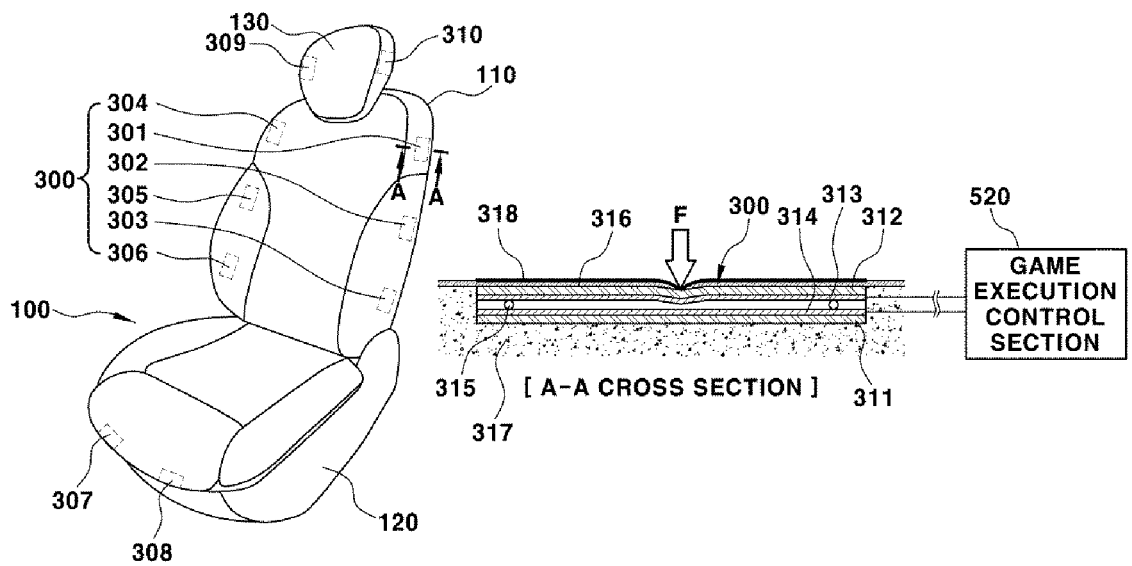
FIG. 2 is a configuration diagram showing an example of the configuration of an entertainment apparatus for a self-driving vehicle when a touch pad is installed according to the present disclosure.

Referring to FIGS. 1 and 2, one or more touch pads, e.g., a plurality of touch pads 300 configured to detect touch pressure of the passenger so as to use the touch pressure of the passenger as an input signal to play a game may be installed at portions of the seat back 110 and the seat cushion 120 that a hand of a passenger is capable of reaching.

The plurality of touch pads 300 may include first, second, and third left touch pads 301, 302, and 303, which are installed to be spaced apart from each other in upward and downward directions at left edge portions of the seat back 110, first, second, and third right touch pads 304, 305, and 306, which are installed to be spaced apart from each other in upward and downward directions at right edge portions of the seat back 110, and first and second lower touch pads 307 and 308, which are installed to be spaced apart from each other in right and left directions at front edge portions of the seat cushion 120.

First and second upper touch pads 309 and 310 may also be further installed at opposite side portions of the head rest 130.

As shown in FIG. 2, each of the plurality of touch pads 300 may be a touch pressure detection type touch pad installed between a seat cover 316 and a seat foam 317 and may include a flexible plastic layer 312 that is disposed at the outermost side so as to be close to the internal surface of the seat cover 316, a glass layer 311 that is disposed at the innermost side to be close so as to the external surface of the seat foam 317, and a first indium tin oxide (ITO) electrode layer 313 adhered to an internal surface of the flexible plastic layer 312 and a second ITO electrode layer 314 adhered to an external surface of the glass layer 311, in which case a spacer 315 is disposed between the first ITO electrode layer 313 and the second ITO electrode layer 314.

In particular, the plurality of touch pads 300 is disposed inside the seat cover 316, and thus a color layer 319 configured to indicate the installation position of each touch pad 300 may be further coated on the external surface of the seat cover 316.

Thus, when the passenger touches the color layer 319 and presses the same with a predetermined pressure or greater, a detection operation may be performed by the touch pad and a signal corresponding to the detected touch pressure may be transmitted to the game operation calculation unit 530 of the control unit 500.

Figure 3:
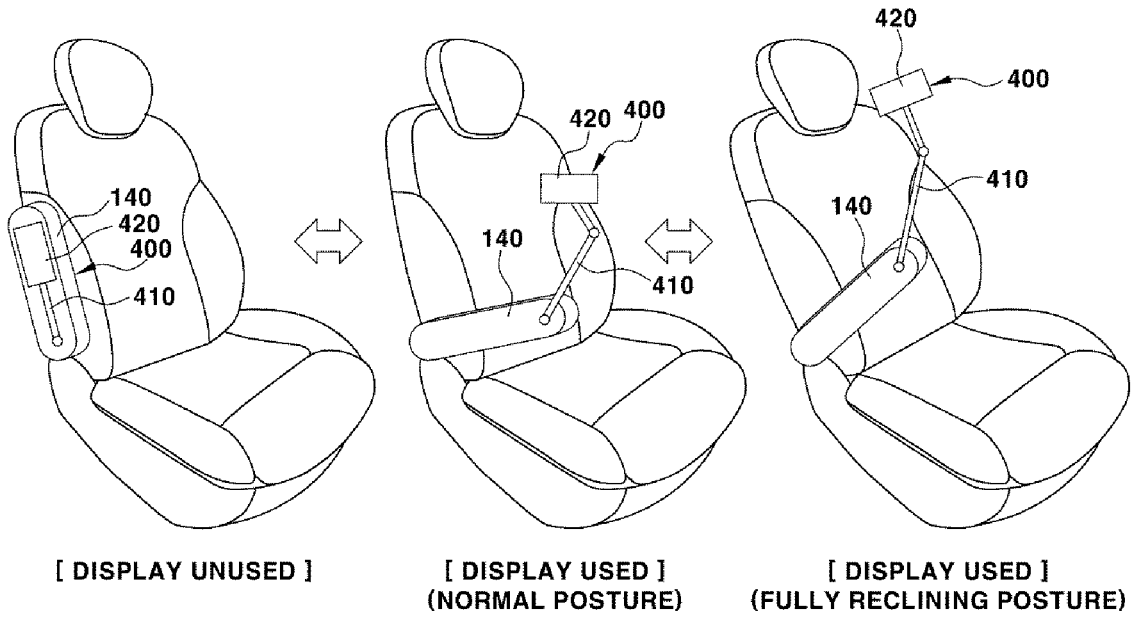
FIG. 3 is a schematic diagram showing an example of the configuration of an entertainment apparatus for a self-driving vehicle when a display is installed according to the present disclosure.

Referring to FIG. 3, a display unit 400 configured to display a start image of a game selected by the passenger may be disposed at a position in the vicinity of the seat that the passenger is capable of viewing.

In particular, the display unit 400 may include an articulated link 410 connected to an arm rest 140 installed at one side of the seat so as to be changed in direction, and a display 420 that is rotatably installed at an end portion of the articulated link 410 via a hinge joint.

Thus, when the passenger changes the articulated link 410 in direction toward his or her front side and then rotates the display 420 into his or her visual field, position setting of the display 420 for a game may be easily performed.

The display unit may be any one selected from an audio video navigation (AVN) display installed in the vehicle, a head up display configured to provide driving information, and a display configured to display a game image through a window glass.

Accordingly, when the passenger powers on the display 420 and then selects a game from a menu, the control unit 500 may output a start image of the game selected by the passenger on the display 420 and may simultaneously control the overall execution of the game selected by the passenger based on a detection signal of the body pressure sensor module 200 including the first and second body pressure sensor modules 210 and 220 and a detection signal of the touch pad 300.

Figure 5:
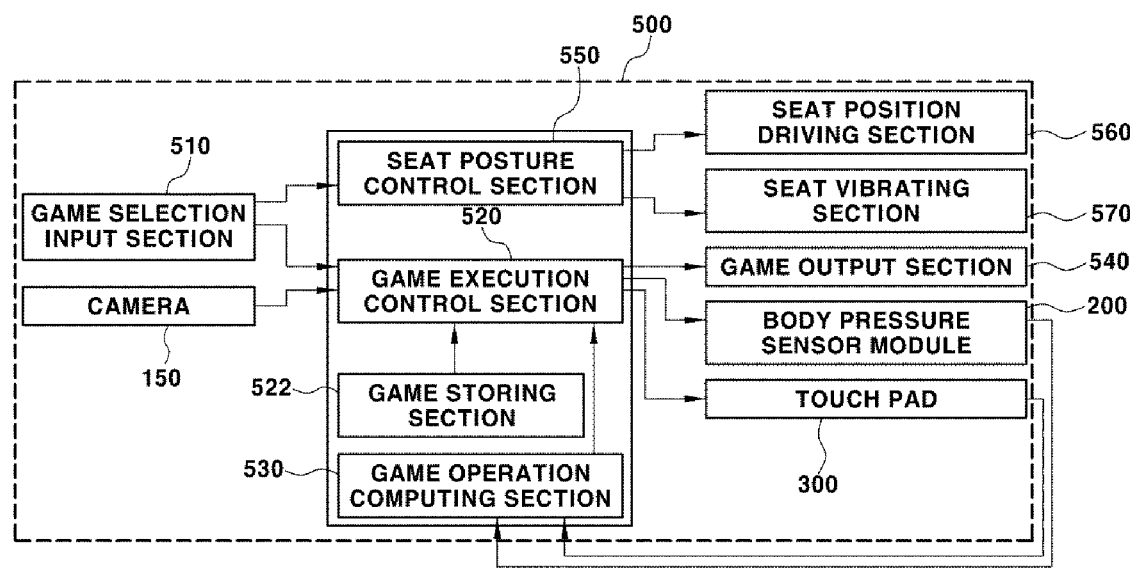
FIG. 5 is a block diagram showing the configuration of control for execution of an entertainment apparatus for a self-driving vehicle according to the present disclosure.

FIG. 5 is a block diagram showing the configuration of control for execution of an entertainment apparatus for a self-driving vehicle according to the present disclosure.

Referring to FIG. 5, the control unit 500 may include a game selection input unit 510 configured to input a game type and mode, a game execution controller 520 configured to execute the game type and mode input through the game selection input unit 510 and to simultaneously apply an enable signal to the body pressure sensor module 200 and the touch pad 300, the game operation calculation unit 530 that receives a detection signal of the body pressure sensor module 200 and the touch pad 300, calculates the current game playing operation of the passenger (the change and distribution of the body pressure of the passenger, checking of a position of a pad on which touch manipulation is performed among a plurality of touch pads, and the like), and then inputs the calculation result to the game execution controller 520, and a game output unit 540 that outputs a game start image to the display 420 and simultaneously outputs a sound in response to a command from the game execution controller 520.

Accordingly, when the passenger powers on the display 420 and then selects a game from a menu, the control unit 500 may display the game selection input unit 510, configured to input a game type and mode to the start image of the game selected by the passenger, on the display 420.

Then, when the passenger inputs a desired game type and mode through the game selection input unit 510, the game execution controller 520 may apply an enable signal to the body pressure sensor module 200 and the touch pad 300 and a detection operation by the body pressure sensor module 200 and the touch pad 300 may begin.

For example, the body pressure sensor module 200 may detect the change and distribution of body pressure as various postures are changed, e.g., as the passenger moves the upper body and lower body to the left or the right, leans back, or changes body pressure at a buttock or a thigh of the lower body while sitting on a seat, and may transmit the detection signal to the game operation calculation unit 530.

When the passenger touches the color layer 319 and presses the same with a predetermined pressure or greater while sitting on the seat, one or more of the plurality of touch pads 300 may detect touch pressure, and a signal corresponding to the detected touch pressure may be transmitted to the game operation calculation unit 530.

Then, the game operation calculation unit 530 may receive a detection signal of the body pressure sensor module 200 and the touch pad 300, may calculate the current game playing operation(the change and distribution of the body pressure of the passenger, checking of a position of a pad on which touch manipulation is performed among a plurality of touch pads, and the like), and may then input the calculation result to the game execution controller 520.

Accordingly, the game execution controller 520 may execute a game according to an execution scenario and explanation of the game selected by the passenger based on the calculation result from the game operation calculation unit 530.

In particular, the game execution controller 520 may include a game storage unit 522 configured to store game types using body pressure and touch and game types using only body pressure or touch as a game that is capable of being selected by the passenger, may retrieve a game that is actually selected by the passenger from the game storage unit 522, and may execute the game.

For example, the game storage unit 522 may store a game using body pressure and/or touch pressure, such as a luge game that requires movement of body pressure among games of the Winter Olympics, a game of whack-a-mole of whacking (touching) a mole to get points, a shooting game of hitting (touching) a target, a balancing game of adjusting positional balance of a character using a change in body pressure, a maze game of changing directions using a change in body pressure, a flight game using a change in body pressure and touch, a racing game that requires movement of body pressure, and the like.

Accordingly, as described above, the game execution controller 520 may retrieve a game selected by the passenger among games stored in the game storage unit 522 and may execute the game, and thus the passenger may play various games while making a gesture of changing body pressure with respect to the body pressure sensor module 200 and simultaneously making a gesture of touching one or more of the plurality of touch pads 300.

The control unit 500 may further include a seat position controller 550 configured to output a signal for adjustment of a seat position according to a game type and mode input through the game selection input unit 510, a seat position driver 560 configured to adjust a seat position to a position corresponding to the game in response to a command from the seat position controller 550, and a seat vibration unit 570 configured to vibrate a seat in a specific situation while the game is executed in response to a command from the game execution controller 520.

In particular, the seat position driver 560 may be employed as a known electromotive reclining device installed at a side portion of the seat back 110 and configured to adjust the reclining angle of the seat back 110, a known electromotive height adjustment device installed in the seat cushion 120 and configured to adjust the height of a front or rear portion of the seat cushion 120, or the like.

Accordingly, when a signal for selecting and inputting a game type and mode is transmitted to the seat position controller 550 through the game selection input unit 510, the seat position controller 550 may make the seat position driver 560 adjust a seat position corresponding to the selected game through a signal for adjustment of a seat position and may adjust the seat position to a position corresponding to the game according to driving of the seat position driver 560.

For example, when the game type selected and input through the game selection input unit 510 is a luge game in which a passenger performs sledding while lying down on his or her back, a seat position in which the seat back 110 is reclined at a predetermined angle may be achieved according to driving of the seat position driver 560.

Figure 6B:
FIGS. 6B to 6F show a method of executing the luge game using an entertainment apparatus for a self-driving vehicle according to the present disclosure.
Figure 6C:
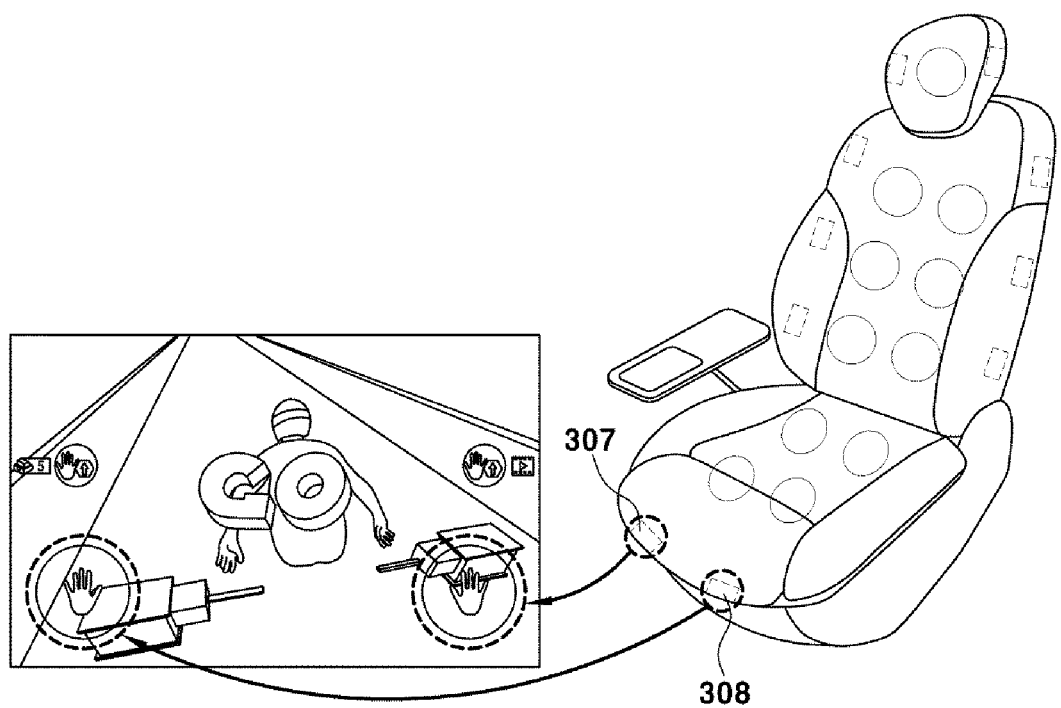
Figure 6D:
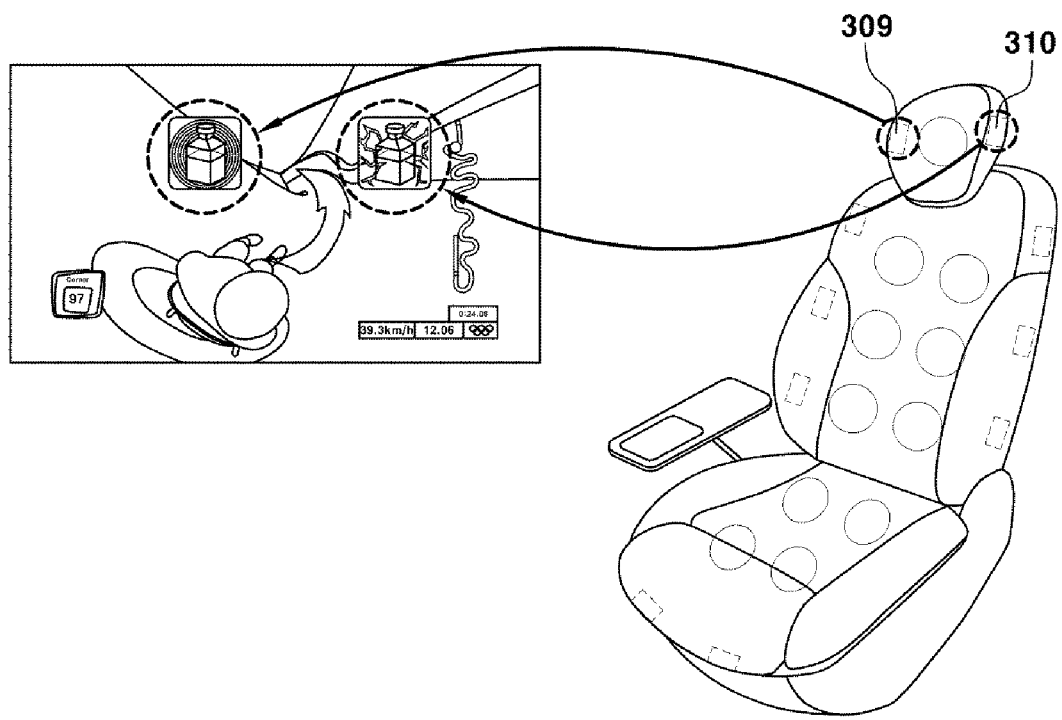
Figure 6E:
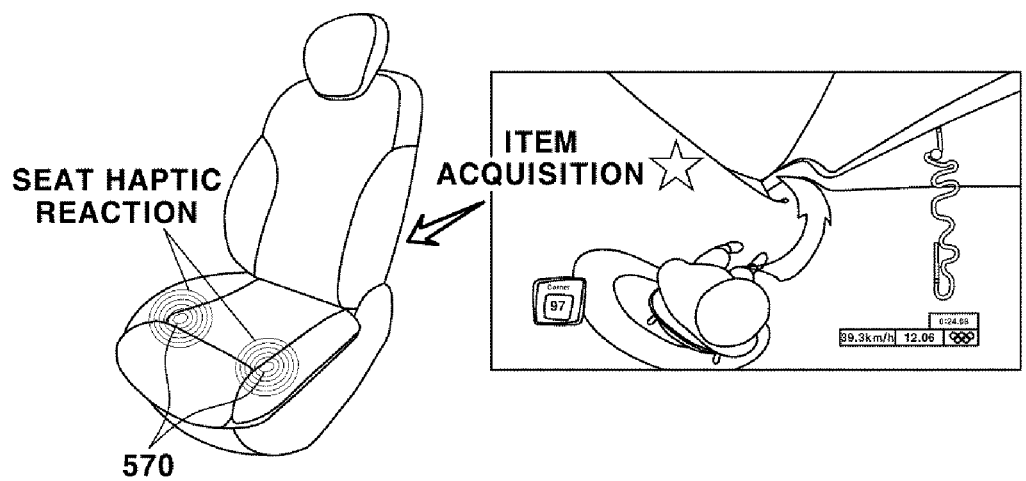
Figure 6F:
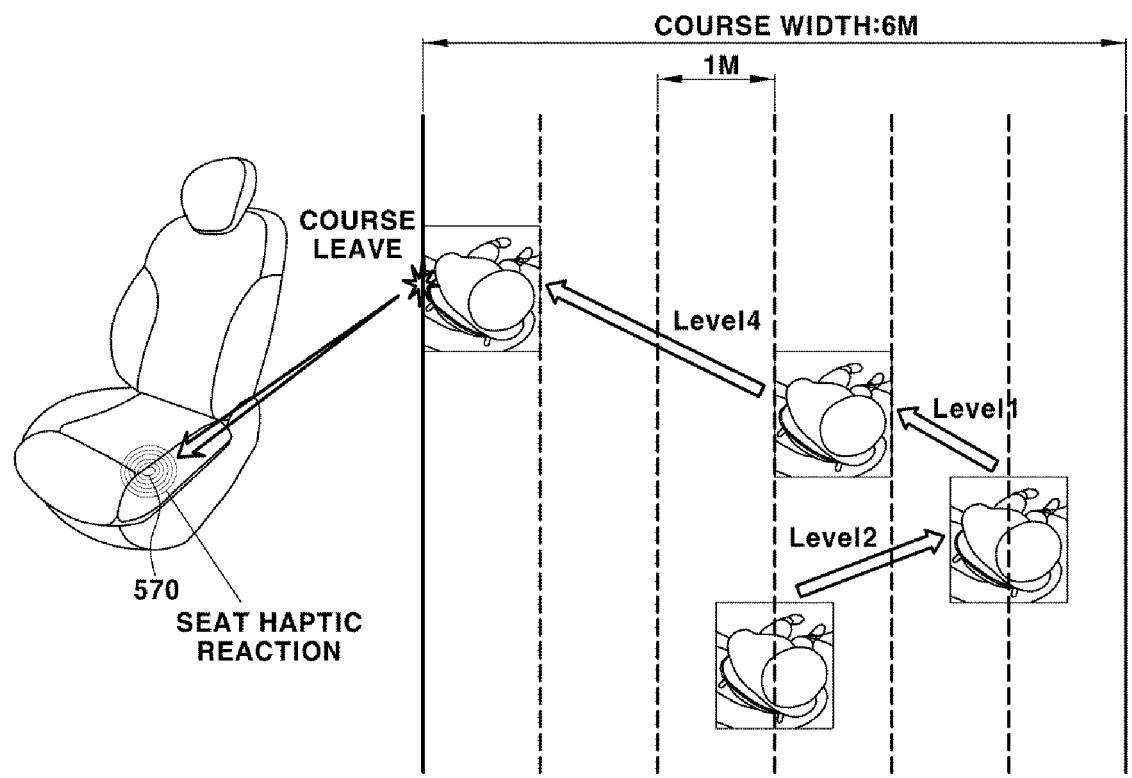

In particular, the seat vibration unit 570 may be employed as a vibration device that is installed at a predetermination position of the seat back 110 or the seat cushion 120 and provides a haptic response in a specific situation (upon moving off the course in a game or when a point is earned) while the game is executed, as shown in FIGS. 6E and 6F.

Accordingly, while a luge game is executed in response to a command from the game execution controller 520, the seat vibration unit 570 may provide a haptic response to allow the passenger to recognize moving off the course in the specific situation of moving off the course in the luge game, as shown in FIG. 6F, and the seat vibration unit 570 may provide a haptic response to allow the passenger to recognize the situation in which a point is earned in the specific situation in which a point is earned, as shown in FIG. 6E.

Hereinafter, an entertainment method based on the above configuration according to the present disclosure will be sequentially described.

First, the passenger may power on the display 420 and may then select and input a game type and mode through the game selection input unit 510 displayed through the display 420.

Then, the game execution controller 520 may execute the game type and mode selected by the passenger and may simultaneously apply an enable signal to the body pressure sensor module 200 and the plurality of touch pads 300 that are installed in the seat.

Thus, the body pressure sensor module 200 and the touch pad 300 may begin to detect the body pressure distribution and touch pressure of the passenger.

In particular, the first body pressure sensor module 210 may detect the distribution of upper body pressure according to movement of the upper body of the passenger, and the second body pressure sensor module 220 may detect the distribution of lower body pressure according to movement of the lower body of the passenger, in which case the ratio in which body pressure is generated may be differentiated and detected according to upper, center, and lower back regions and may then be transmitted to a game operation calculation unit 530 of a control unit 500, as shown in FIG. 4.

For example, the body pressure sensor module 200 may detect the change and distribution of body pressure when changing between various postures, e.g., when the passenger moves the upper body and the lower body to the left or the right, leans back, or changes the amount of body pressure applied by a buttock or a thigh of the lower body while sitting on a seat, and may transmit the detection signal to the game operation calculation unit 530.

When the passenger touches the color layer 319 and presses the same with a predetermined pressure or greater while sitting on the seat, one or more of the plurality of touch pads 300 may detect touch pressure and a signal corresponding to the detected touch pressure may be transmitted to the game operation calculation unit 530.

Then, the game operation calculation unit 530 may receive a detection signal of the body pressure sensor module 200 and the touch pad 300, may calculate the current game playing operation (the change and distribution of the body pressure of the passenger, checking of a position of a pad on which touch manipulation is performed among a plurality of touch pads, and the like), and may then input the calculation result to the game execution controller 520.

Accordingly, the game execution controller 520 may execute a game according to an execution scenario and explanation of the game selected by the passenger based on the calculation result from the game operation calculation unit 530, and thus the game output unit 540 may output a game start image and a sound.

When the passenger is bored or plays the corresponding game for an excessively long time while playing the same, termination of the game may be recommended.

To this end, a facial expression recognition camera 150 configured to recognize a facial expression of the passenger and to determine whether to terminate the game may be installed in an indoor head lining of the vehicle, or the like.

Figure 10A:
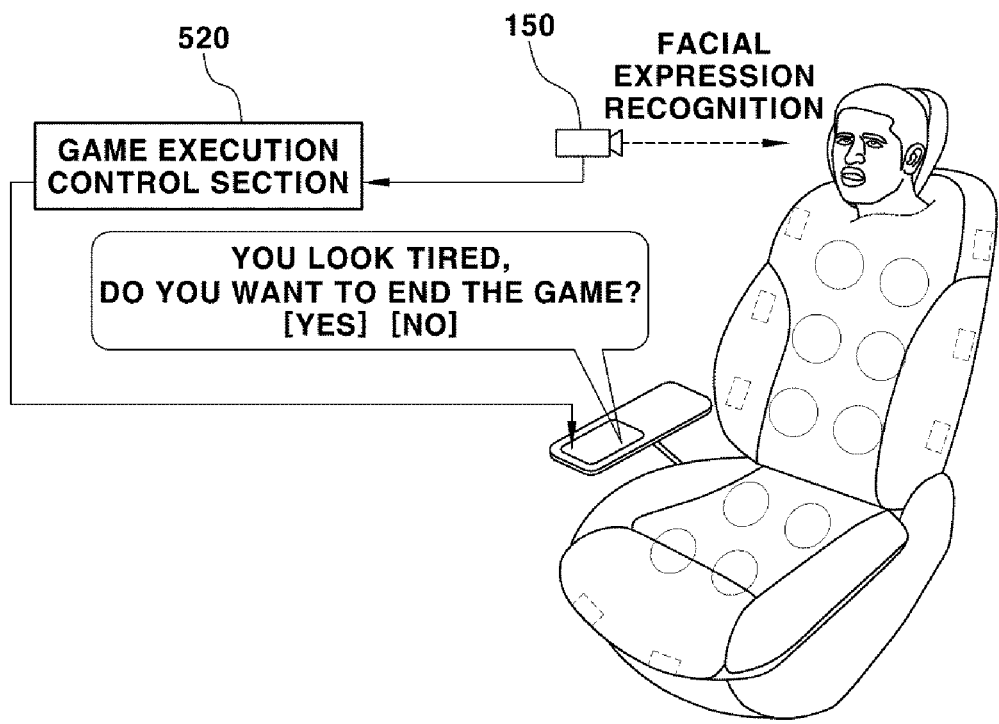
FIGS. 10A and 10B are diagrams showing a method of guiding termination of a game using an entertainment apparatus for a self-driving vehicle according to the present disclosure.

Accordingly, as shown in FIG. 10A, when the facial expression recognition camera 150 recognizes the facial expression of the passenger who currently plays the game, if the facial expression of the passenger expresses boredom or tiredness, the facial expression recognition camera 150 may input a termination recommendation signal to the game execution controller 520.

Then, the game execution controller 520 may output a message, recommending game termination or playing another game play, to the display 420, and thus may guide the passenger who currently plays the game to terminate the game or to select another game.

Figure 10B:
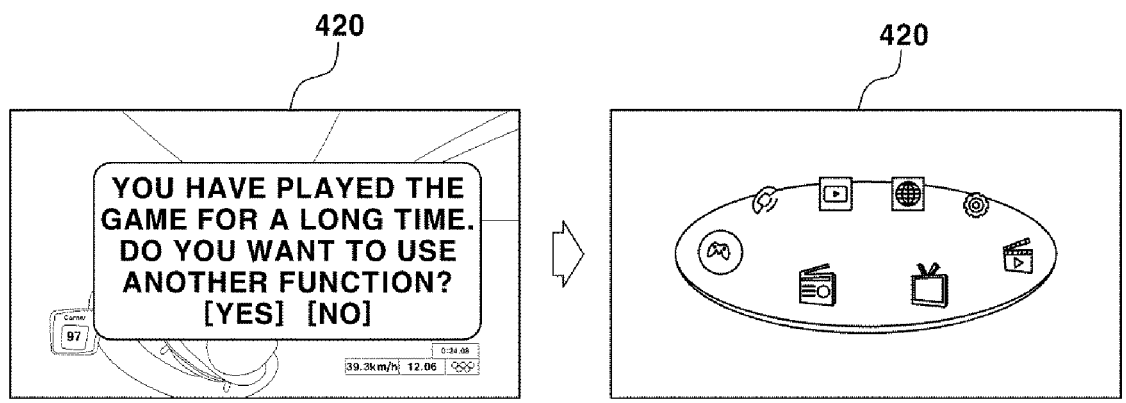

Alternatively, as shown in FIG. 10B, the recommendation of game termination may include counting a game execution time by the game execution controller 520, recommending game termination by the game execution controller 520 when the game execution time is a predetermined time or longer, or outputting a message recommending playing another game to the display 420.

Hereinafter, an example of execution of the luge game that is embodied by an entertainment apparatus and method according to the present disclosure will be described.

FIG. 6A is a flowchart showing a procedure of executing the luge game using an entertainment apparatus for a self-driving vehicle according to the present disclosure. FIGS. 6B to 6F show a method of executing the luge game.

First, when the game type selected and input through the game selection input unit 510 is a luge game in which a passenger performs sledding while lying down on his or her back, a seat position in which the seat back 110 reclines backwards may be achieved by driving the seat position driver 560 (S101).

For example, a seat back may be fully reclined backwards by the electromotive reclining device.

When the passenger changes the articulated link 410 in a direction toward his or her front side and then rotates the display 420 toward his or her visual field, position setting of the display 420 for a gamer may be performed (S102).

Then, the game execution controller 520 may display a description of a method of the luge game(refer to FIG. 6B) and a game course and may then execute the luge game (S103).

Along with start of the luge game, the passenger may change body pressure according to the track of the luge game and may perform a motion at a constant velocity, an accelerating motion, a decelerating motion, a left turn, and a right turn along with a change in body pressure, as shown in FIG. 6B.

Motion at Constant Velocity

In a state in which respective body pressures detected between the left body pressure sensors 211, 212, and 213 and the right body pressure sensors 214, 215, and 216 of the first body pressure sensor module 210 are uniform, the respective body pressures detected between the left body pressure sensors 221 and 222 and the right body pressure sensors 223 and 224 of the second body pressure sensor module 220 are uniform, and intensive body pressure is detected by all of the $(1-3)^{rd}$ left body pressure sensor 213 for detection of body pressure of a left side of a waist of a passenger, the $(1-3)^{rd}$ right body pressure sensor 216 for detection of body pressure of a right side of a waist of the passenger, the $(2-1)^{th}$ left body pressure sensor 221 for detection of body pressure of a left buttock of the passenger, and the $(2-1)^{th}$ right body pressure sensor 223 for detection of body pressure of a right buttock of the passenger, a motion at a constant velocity may be achieved in the luge game.

Accelerating Motion

In a state in which intensive body pressure is detected by the $(1-1)^{th}$ left body pressure sensor 211 for detection of body pressure of a left upper back of a passenger, the $(1-1)^{th}$ right body pressure sensor 214 for detection of body pressure of a right upper back of the passenger, the $(2-1)^{th}$ left body pressure sensor 221 for detection of body pressure of a left buttock of the passenger, and the $(2-1)^{th}$ right body pressure sensor 223 for detection of body pressure of a right buttock of the passenger, an accelerating motion may be achieved in the luge game.

Decelerating Motion

In a state in which intensive body pressure is detected by the $(2-1)^{th}$ left body pressure sensor 221 for detection of body pressure of a left buttock of a passenger, the $(2-2)^{nd}$ left body pressure sensor 222 for detection of body pressure of a left thigh of the passenger, the $(2-1)^{th}$ right body pressure sensor 223 for detection of body pressure of a right buttock of the passenger, and the $(2-2)^{nd}$ right body pressure sensor 224 for detection of body pressure of a right thigh of the passenger, a decelerating motion may be achieved in the luge game.

Left Turn

In a state in which intensive body pressure is detected by the $(1-1)^{th}$ left body pressure sensor 211 for detection of body pressure of a left upper back of a passenger, the $(1-2)^{nd}$ left body pressure sensor 212 for detection of body pressure of a left center back of the passenger, the $(1-3)^{rd}$ left body pressure sensor 213 for detection of body pressure of a left side of a waist of the passenger, the $(2-1)^{th}$ left body pressure sensor 221 for detection of body pressure of a left buttock of the passenger, and the $(2-2)^{nd}$ left body pressure sensor 222 for detection of body pressure of a left thigh of the passenger, a left turn may be achieved in the luge game.

Right Turn

In a state in which intensive body pressure is detected by the $(1-1)^{th}$ right body pressure sensor 214 for detection of body pressure of a right upper back of a passenger, the $(1-2)^{nd}$ right body pressure sensor 215 for detection of body pressure of a right center back of the passenger, the $(1-3)^{rd}$ right body pressure sensor 216 for detection of body pressure of a right side of a waist of the passenger, the $(2-1)^{th}$ right body pressure sensor 223 for detection of body pressure of a right buttock of the passenger, and the $(2-2)^{nd}$ right body pressure sensor 224 for detection of body pressure of a right thigh of the passenger, a right turn may be achieved in the luge game.

As such, the first body pressure sensor module 210 and the second body pressure sensor module 220 may analyze a change (movement) in the body pressure of a passenger who participates in the luge game and may transmit the analysis result to the game operation calculation unit 530 of the control unit 500 (S104).

That is, the first body pressure sensor module 210 may detect the distribution of upper body pressure according to movement of the upper body of the passenger, and the second body pressure sensor module 220 may detect the distribution of lower body pressure according to movement of the lower body of the passenger, in which case the ratio in which body pressure is generated may be differentiated and detected according to upper, center, and lower back regions and may then be transmitted to the game operation calculation unit 530 of the control unit 500.

Then, the game operation calculation unit 530 may perform calculation of synchronizing an action by the passenger of changing the body pressure thereof with a posture of a character (a luge player) in the game based on the aforementioned body pressure detection signal of the passenger (S105).

Accordingly, the game execution controller 520 may execute a game according to an execution scenario and explanation of the luge game based on the calculation result from the game operation calculation unit 530.

In this case, as shown in FIG. 6C, as a method of starting a luge by a passenger, the first and second lower touch pads 307 and 308, which are installed so as to be spaced apart from each other in right and left directions at front edge portions of the seat cushion 120 may be repeatedly touched with the hand.

When the passenger faces a specific situation (e.g., when an item appears at a specific position on a luge course) while playing the luge game, the passenger may touch the first and second upper touch pads 309 and 310 installed at the opposite side portions of the head rest 130 to thus acquire the corresponding item, as shown in FIG. 6D.

When the passenger faces a specific situation (e.g., an item that appears in a luge course is successfully acquired) while playing the luge game, the seat vibration unit 570 may vibrate to thus indicate that the passenger successfully acquires the item in response to a command from the game execution controller 520, as shown in FIG. 6E.

As such, the game execution controller 520 may analyze whether movement off the course of the luge game occurs while the luge game is executed (S106).

For example, as shown in Table 1 below, the ratio in which the body pressure of a passenger is generated and the concentration degree of the body pressure are classified and scored according to levels 1 to 4, and whether or not movement off the course of the luge game occurs may be analyzed in a state in which the moving distance in a width direction of a course is set for each level.

TABLE 1

| | Right and left moving distance | | |
|---|---|---|---|
| Division | Body pressure generation ratio (PAR) | Body pressure concentration degree (PAUE) | Moving distance (per 0.5 seconds) |
| Level 1 | 300-350 points | 250-300 points | −0.75M |
| Level 2 | 300-350 points | 300 points↑ | 0.75-1M |
| Level 3 | 350 points↑ | 250-300 points | 1-1.25M |
| Level 4 | 350 points↑ | 300 points↑ | 1.25-1.5M |

When whether or not movement off the course of the luge game occurs is analyzed, whether or not movement off the course is likely to occur may be checked (S107), and when it is determined that movement off the course occurs, the seat vibration unit 570 at one side may vibrate in response to a command from the game execution controller 520 to thus allow the passenger to recognize movement off the course, as shown in FIG. 6F (S108).

When the game execution controller 520 determines a specific situation (e.g., when an item that appears in a luge course is successfully acquired) while the passenger plays the luge game (S109), and as the determination result, when an item, a point, and the like are determined to be acquired (S110), a game point may be calculated by summing points, temporal points, and the like (S111).

Hereinafter, an example of execution of the game of whack-a-mole that is embodied by an entertainment apparatus and method according to the present disclosure will be described.

Figure 7A:
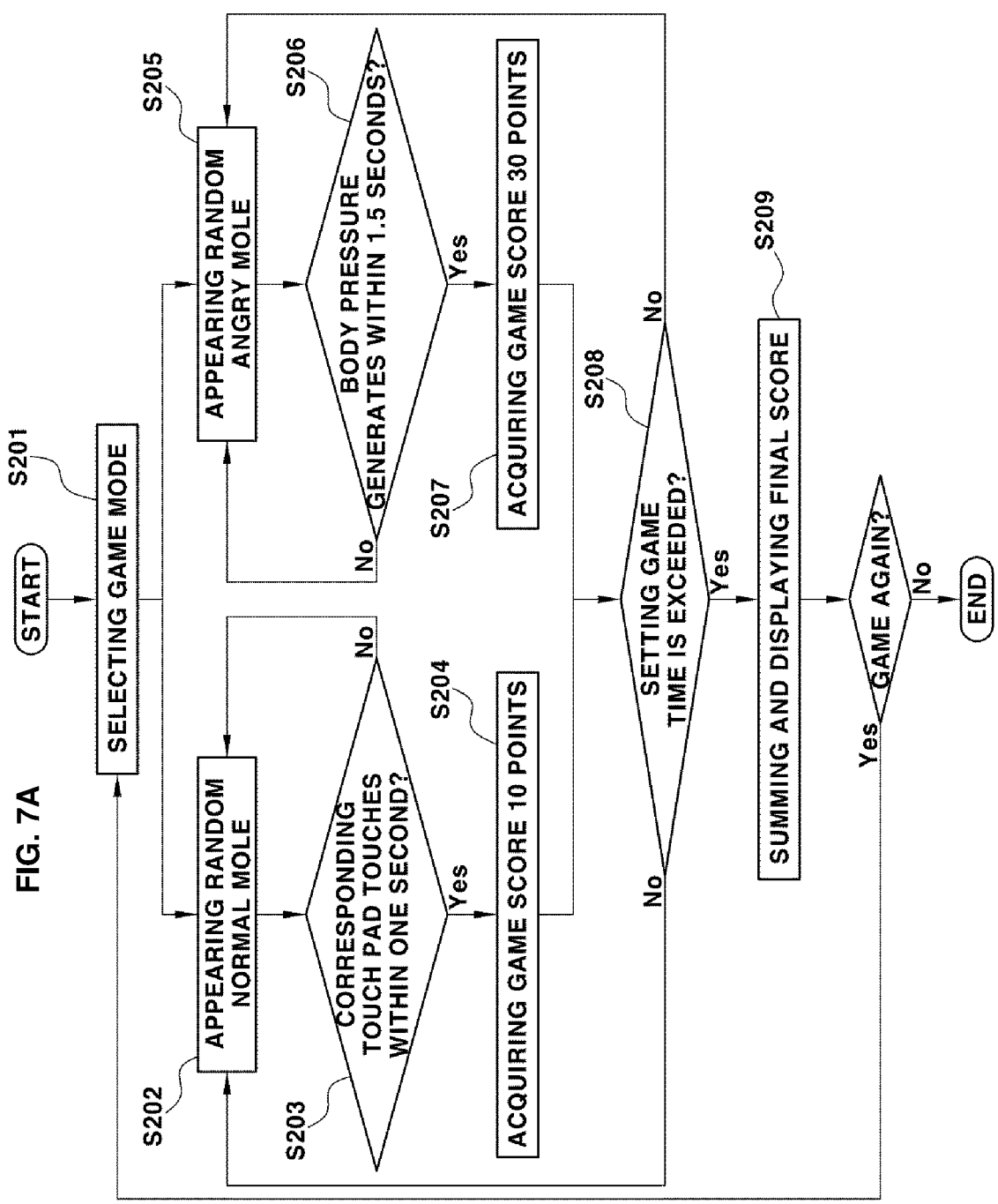
FIG. 7A is a flowchart showing a procedure of executing a game of whack-a-mole using an entertainment apparatus for a self-driving vehicle according to the present disclosure.
Figure 7B:
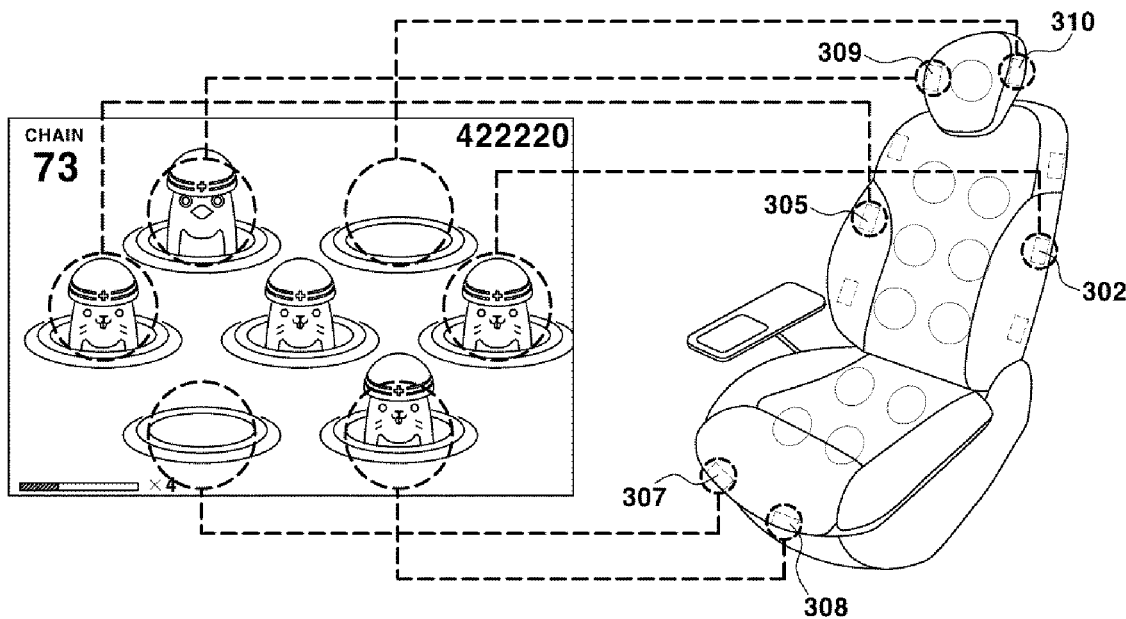
FIGS. 7B and 7C show a method of executing the game of whack-a-mole using an entertainment apparatus for a self-driving vehicle according to the present disclosure.
Figure 7C:
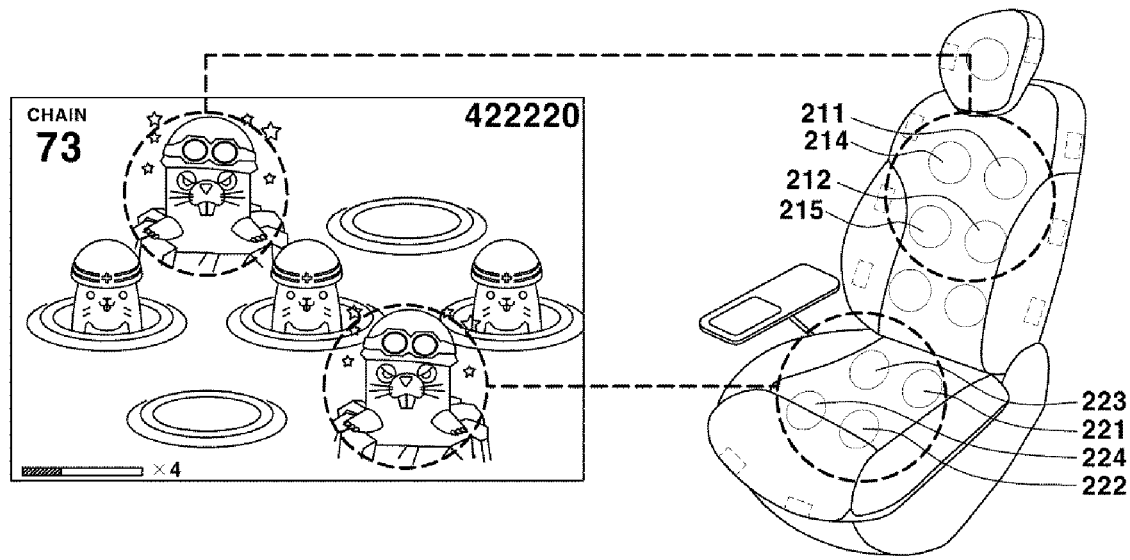

FIG. 7A is a flowchart showing a procedure of executing the game of whack-a-mole using an entertainment apparatus for a self-driving vehicle according to the present disclosure. FIGS. 7B and 7C show a method of executing the game of whack-a-mole.

First, when the game type selected and input through the game selection input unit 510 is the game of whack-a-mole of hitting a mole, the passenger may select a game mode (e.g., an easy mode or a difficult mode) (S201).

Then, the game execution controller 520 may provide an explanation for describing how to play whack-a-mole through the display 420 and may then execute the game of whack-a-mole.

For example, as shown in FIG. 7B, a touch pad among the plurality of touch pads 300, corresponding to a region in which a mole frequently appears, may be indicated through the display 420 and then the game of whack-a-mole may be executed.

Thus, when the game mode is an easy mode, a mole randomly appears on the display 420 as shown in FIG. 7B (S202) and the passenger may play the game using a method of touching one or more of the plurality of touch pads 300.

For example, when the passenger touches one or more of touch pads that are set to hit an appearing mole among the plurality of touch pads 300 within one second (S203), a point may be acquired (e.g., 10 points are acquired) (S204).

On the other hand, when the game mode is a difficult mode, a large mole with an angry facial expression may appear on the display 420 as shown in FIG. 7C (S205), and the passenger may play the game using a method of applying intensive body pressure to the first body pressure sensor module 210 or the second body pressure sensor module 220 to remove the large mole.

For example, when the passenger applies intensive body pressure to the first body pressure sensor module 210 or the second body pressure sensor module 220 within 1.5 seconds in order to remove the large mole that currently appears (S206), points corresponding to removal of the mole may be acquired (e.g., 30 points are acquired) (S207).

During the game of whack-a-mole, the game execution controller 520 may determine whether a game play time exceeds a set game time (S208), and when the game play time exceeds the set game time, finally summed points may be displayed on the display 420 (S209).

Hereinafter, an example of execution of a rhythm dance game that is embodied by an entertainment apparatus and method according to the present disclosure will be described.

Figure 8A:
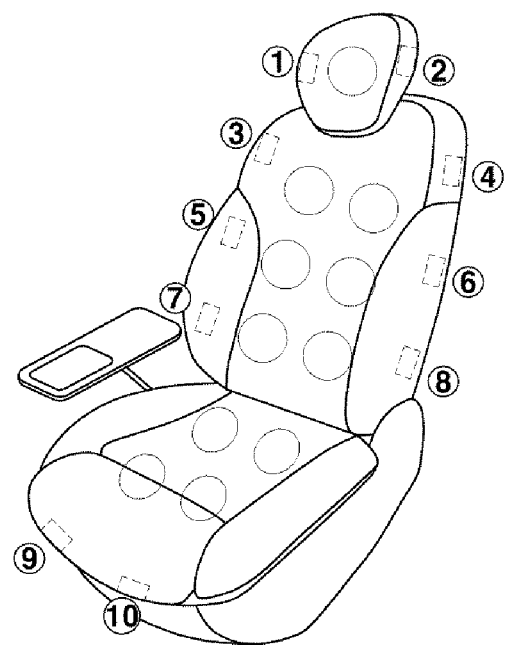
FIGS. 8A and 8B show a method of executing a rhythm dance game using an entertainment apparatus for a self-driving vehicle according to the present disclosure.
Figure 8B:
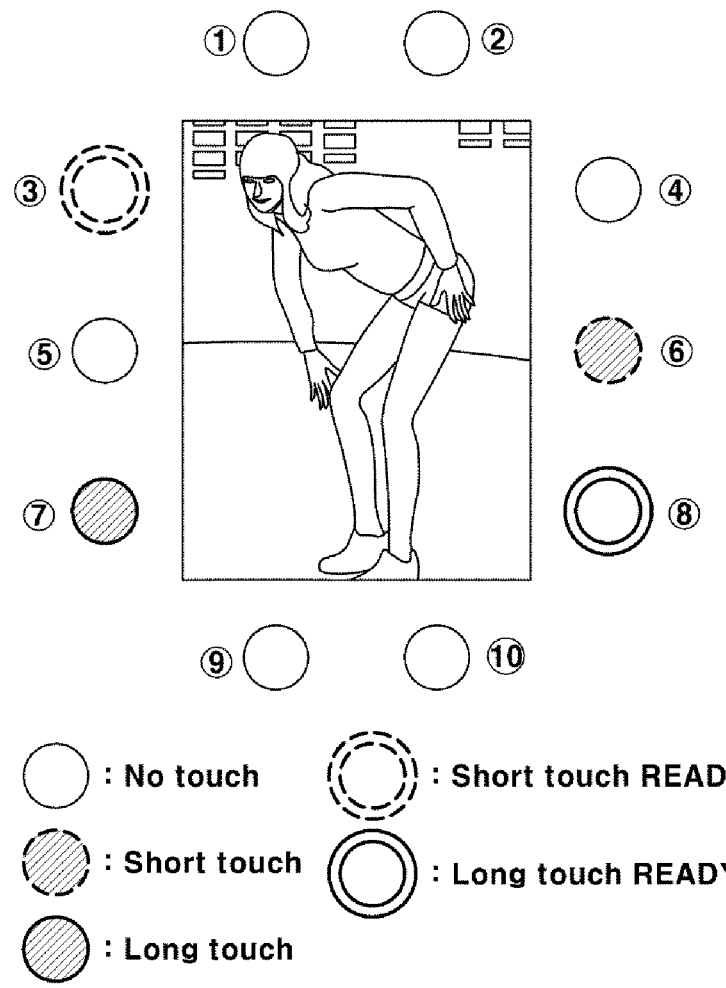

FIGS. 8A and 8B show a method of executing the rhythm dance game using an entertainment apparatus for a self-driving vehicle according to the present disclosure.

First, when the game type selected and input through the game selection input unit 510 is a rhythm dance game, the game execution controller 520 may provide an explanation for describing how to play the rhythm dance game through the display 420 and may then execute the rhythm dance game.

For example, as shown in FIG. 8A, the plurality of touch pads 300 may be numbered and displayed, and touch regions displayed on the display 420 may also be numbered, as shown in FIG. 8B.

Thus, the game may proceed using a method in which the passenger touches a touch pad corresponding to the number of a touch region displayed on the display 420 among the plurality of touch pads 300 for a split second or for a long time equal to or longer than a predetermined time.

Figure 9:
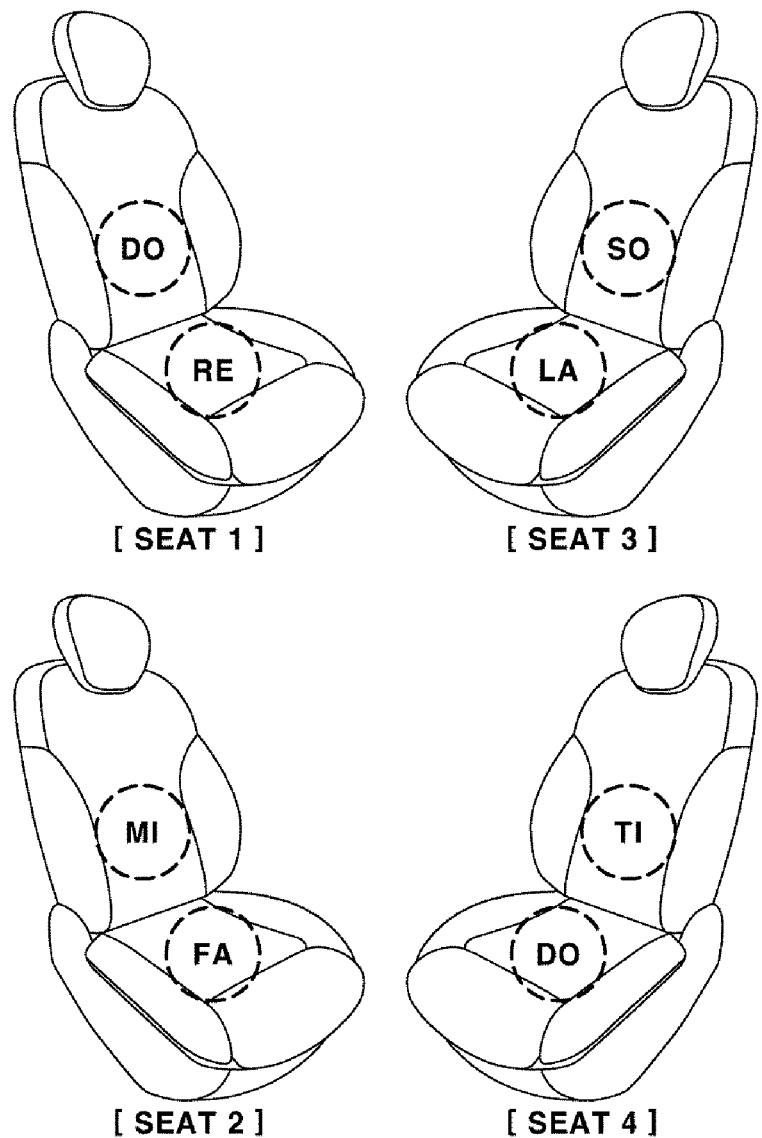
FIG. 9 is a diagram showing a method of executing an ensemble game using an entertainment apparatus for a self-driving vehicle according to the present disclosure.

As shown in FIG. 9, passengers who sit on first to fourth seats of the self-driving vehicle, respectively, may play an ensemble game.

For example, the passengers may play the ensemble game using a method in which a passenger sees a musical note through his or her own display and applies intensive body pressure to a body pressure sensor module when it is his or her turn.

Other than the aforementioned luge game, whack-a-mole, rhythm dance game, and ensemble game, the passenger may select and play a game using body pressure and/or touch pressure, such as a shooting game of hitting (touching) a target, a balancing game of adjusting the positional balance of a character using a change in body pressure, a maze game of changing directions using a change in body pressure, a flight game using a change in body pressure and touch, a racing game that requires movement of body pressure, and the like, through the game selection input unit 510.

As described above, in a self-driving vehicle that will be released in the future, a game may be executed and may proceed based on a body pressure distribution signal that is detected by a body pressure sensor during movement of upper and lower back regions and a touch pressure signal detected by moving a hand and a finger and touching a touch pad in a state in which a passenger sits on a seat of the self-driving vehicle, and thus an exercise effect of moving a human body may be provided to a passenger, and simultaneously an entertainment effect of tickling the passenger to relieve boredom thereof may be provided to the passenger.

Through the aforementioned configuration, the present disclosure may provide the following effects.

First, an exercise effect of moving a human body may be provided to a passenger, and simultaneously an entertainment effect of tickling the passenger to relieve boredom thereof may be provided to the passenger during a long trip by a self-driving vehicle that will be released in the future.

Second, a game may be executed and may proceed based on a body pressure distribution signal that is detected by a body pressure sensor during movement of upper and lower back regions and a touch pressure signal detected by moving a hand and a finger and touching a touch pad in a state in which a passenger sits on a seat having a body pressure sensor and a touch pad installed therein, and thus the passenger may play various games related to body pressure and/or a touch signal.

Third, the passenger may play various games using body pressure and/or touch pressure, such as a game of whack-a-mole, a shooting game, a balancing game, a maze game, a flight game, and a racing game as well as a luge game, which is one of the games of the Winter Olympics.

What is claimed is:

1. An entertainment apparatus for a self-driving vehicle, comprising:
 a body pressure sensor module installed at right and left symmetric positions of a seat having a seat back and a seat cushion, the body pressure sensor module configured to detect distribution of upper body pressure and lower body pressure of a passenger;
 a touch pad installed in the seat back or the seat cushion capable of detecting touch pressure of the passenger;
 a display unit disposed at a position in the vicinity of the seat that the passenger is capable of viewing and configured to display a start image of a game selected by the passenger; and
 a control unit configured to output the start image of the game selected by the passenger to the display unit and to simultaneously control overall execution of the game selected by the passenger based on a detection signal of the body pressure sensor module or a detection signal of the touch pad, or the detection signal of the body pressure sensor module and the detection signal of the touch pad,
 wherein the body pressure sensor module includes:
 a first body pressure sensor module installed at right and left symmetric positions of the seat back and configured to detect the distribution of an upper body pressure of the passenger; and
 a second body pressure sensor module installed at right and left symmetric positions of the seat cushion and configured to detect the distribution of a lower body pressure of the passenger.

2. The entertainment apparatus of claim 1, wherein the first body pressure sensor module includes:
 a $(1\text{-}1)^{th}$ left body pressure sensor configured to detect body pressure of a left upper back of the passenger;
 a $(1\text{-}2)^{nd}$ left body pressure sensor configured to detect body pressure of a left center back of the passenger;
 a $(1\text{-}3)^{rd}$ left body pressure sensor configured to detect body pressure of a left side of a waist of the passenger;
 a $(1\text{-}1)^{th}$ right body pressure sensor configured to detect body pressure of a right upper back of the passenger;
 a $(1\text{-}2)^{nd}$ right body pressure sensor configured to detect body pressure of a right center back of the passenger; and
 a $(1\text{-}3)^{rd}$ right body pressure sensor configured to detect body pressure of a right side of a waist of the passenger.

3. The entertainment apparatus of claim 1, wherein the second body pressure sensor module includes:
 a $(2\text{-}1)^{th}$ left body pressure sensor configured to detect body pressure of a left buttock of the passenger;
 a $(2\text{-}2)^{nd}$ left body pressure sensor configured to detect body pressure of a left thigh of the passenger;
 a $(2\text{-}1)^{th}$ right body pressure sensor configured to detect body pressure of a right buttock of the passenger; and
 a $(2\text{-}2)^{nd}$ right body pressure sensor configured to detect body pressure of a right thigh of the passenger.

4. The entertainment apparatus of claim 1, wherein the touch pad is selected from one of a plurality of touch pads, the plurality of touch pads comprising:
 first, second, and third left touch pads that are installed to be spaced apart from each other in upward and downward directions at left edge portions of the seat back;
 first, second, and third right touch pads that are installed to be spaced apart from each other in upward and downward directions at right edge portions of the seat back;
 first and second lower touch pads that are installed to be spaced apart from each other in right and left directions at front edge portions of the seat cushion; and
 first and second upper touch pads installed at opposite side portions of a head rest.

5. The entertainment apparatus of claim 4, wherein a color layer configured to indicate an installation position of the touch pad is coated on an external surface of a seat cover for covering the touch pad.

6. The entertainment apparatus of claim 1, wherein the display unit includes:
 an articulated link connected to an arm rest installed at one side of the seat to be changed in direction; and
 a display rotatably installed at an end portion of the articulated link.

7. The entertainment apparatus of claim 1, wherein the display unit is selected from an audio video navigation (AVN) display installed in the vehicle, a head up display configured to provide driving information, and a display configured to display a game image through a window glass.

8. The entertainment apparatus of claim 1, wherein the control unit includes:
 a game selection input unit configured to input a game type and mode;
 a game execution controller configured to execute the game type and mode input through the game selection input unit and to simultaneously apply an enable signal to the body pressure sensor module and the touch pad;
 a game operation calculation unit configured to receive a detection signal of the body pressure sensor module and the touch pad, to calculate a current game playing operation of the passenger, and to then input a calculation result to the game execution controller; and
 a game output unit configured to output a game start image and a sound in response to a command from the game execution controller.

9. The entertainment apparatus of claim 8, wherein the game execution controller includes a game storage unit configured to store game types using body pressure and touch and game types using only body pressure or touch as a game that is capable of being selected by the passenger.

10. The entertainment apparatus of claim 9, wherein the game type includes a luge game, a game of whack-a-mole, a rhythm dance game, and an ensemble game.

11. The entertainment apparatus of claim 8, wherein the control unit includes:
 a seat position controller configured to output a signal for adjustment of a seat position according to the game type and mode input through the game selection input unit;
 a seat position driver configured to adjust the seat position in response to a command from the seat position controller; and
 a seat vibration unit configured to vibrate the seat in a specific situation while the game is executed in response to the command from the game execution controller.

12. The entertainment apparatus of claim 11, wherein the seat position driver is selected as an electromotive reclining device installed at the seat back, and an electromotive height adjustment device installed in the seat cushion.

13. The entertainment apparatus of claim 11, wherein the seat vibration unit is selected as a vibration device installed at a predetermination position of the seat back or the seat cushion and configured to provide a haptic response.

14. The entertainment apparatus of claim 1, further comprising a facial expression recognition camera configured to recognize a facial expression of the passenger and to determine whether to terminate the game.

15. A self-driving automobile comprising an entertainment apparatus, the entertainment apparatus comprising:
- a body pressure sensor module installed at right and left symmetric positions of a seat having a seat back and a seat cushion, the body pressure sensor module configured to detect distribution of upper body pressure and lower body pressure of a passenger;
- a touch pad installed in the seat back or the seat cushion capable of detecting touch pressure of the passenger;
- a display unit disposed at a position in the vicinity of the seat that the passenger is capable of viewing and configured to display a start image of a game selected by the passenger; and
- a control unit configured to output the start image or the game selected by the passenger to the display unit and to simultaneously control overall execution of the game selected by the passenger based on a detection signal of the body pressure sensor module or a detection signal of the touch pad, or the detection signal or the body pressure sensor module and the detection signal of the touch pad, wherein the body pressure sensor module includes:
- a first body pressure sensor module installed at right and left symmetric positions or the seat back and configured to detect the distribution of an upper body pressure of the passenger; and
- a second body pressure sensor module installed at right and left symmetric positions of the seat cushion and configured to detect the distribution of a lower body pressure of the passenger.

* * * * *